United States Patent [19]

Everts

[11] Patent Number: 5,339,526

[45] Date of Patent: Aug. 23, 1994

[54] RESISTANCE SPOOL FOR A LINE TRIMMER HEAD

[75] Inventor: Robert G. Everts, Chandler, Ariz.

[73] Assignee: Ryobi Outdoor Products, Chandler, Ariz.

[21] Appl. No.: 51,186

[22] Filed: Apr. 22, 1993

[51] Int. Cl.⁵ .................. B26B 13/06; B26B 13/16; A01D 53/14
[52] U.S. Cl. ...................... 30/276; 30/347; 56/12.5
[58] Field of Search .......... 30/246, 276, 347; 56/12.5, 12.7

[56] References Cited

U.S. PATENT DOCUMENTS

| | | |
|---|---|---|
| 4,274,201 | 6/1981 | Oberg et al. |
| 4,660,286 | 4/1987 | Engelbrecht et al. ........ 56/12.5 |
| 5,060,384 | 10/1991 | Everts . |
| 5,095,688 | 3/1992 | Fabrizio ........ 30/276 |
| 5,109,607 | 5/1992 | Everts . |

Primary Examiner—Richard K. Seidel
Assistant Examiner—Paul M. Heyrana, Sr.
Attorney, Agent, or Firm—Brooks & Kushman

[57] ABSTRACT

A resistance spool (16) for holding lines (38,40) in a line trimmer head (10) is disclosed. The spool (16) has a rotatable main body (19) having lines (38,40) wound thereon. The wound lines (38,40) have free ends (42,44) which extend radially from the main body (19). Clamp portions (32,34,36), on the main body (19), restrain the free ends (42,44) of the lines (38,40). The clamp portions (32,34,36) restrain the free ends (42,44) so that the lines (38,40) do not unwind from the spool (16) when the main body (19) is not rotating at a sufficient speed and allows the free ends (42,44) of lines (38,40) to pay out from the spool (16) when the main body (19) is rotating at a sufficient speed. Preferably, the main body (19) includes a hub (20) and axially disposed flanges (22,24,26) extending radially outwardly from the hub (20). The flanges (22,24,26) cooperate with one another to pinch the line (38,40) such that the line (38,40) may not unravel during installation of the spool (16) within a line trimmer head (10).

12 Claims, 2 Drawing Sheets

RESISTANCE SPOOL FOR A LINE TRIMMER HEAD

INCORPORATION BY REFERENCE

This application incorporates by reference U.S. Pat. No. 5,060,284, entitled "*Automatic Head For A Line Trimmer*" which issued on Oct. 29, 1991.

TECHNICAL FIELD

The present invention relates generally to line trimmers for cutting vegetation and, more particularly, relates to spools having filament line wound thereon which are installed in the heads of line trimmers.

BACKGROUND ART

Conventional spools for line trimmers have a central hub and a pair of axially spaced and radially extending annular flanges forming an annular chamber, which is U-shaped in cross-section, for receiving filament line. The spools are often made of a rigid molded plastic.

Typically, a pair of lengths of filament line are wound on the spool. First ends of each filament line are secured by tape or other means to the central hub. The majority of the remainder of the filament lines is then tautly wrapped about the hub to prevent unravelling or tangling of the lines. Small lengths of each line, approximately four to eight inches, are allowed to extend freely from the spool.

The spool is then installed within a housing of a line trimmer head. The spool is usually connected relative to and rotates with the housing which is driven by a shaft connected to a motor or engine. The housing usually contains two diametrically opposed apertures for receiving the two free ends of the filament lines. These free ends, which move with the spool and housing during operation of the line trimmer, cut vegetation as they rotate.

The installation of the spool and filament lines into the line trimmer head requires a good deal of manual dexterity. Each of the two free ends of the filament line must be held taut to prevent the lines from unravelling while the spool is properly aligned and mounted into the housing of the line trimmer head. Simultaneously, the free ends of the filament lines must be threaded through the apertures in the housing. Accordingly, this installation can be difficult and frustrating.

The present invention provides a spool which is easier to mount into a head of a line trimmer.

DISCLOSURE OF INVENTION

A resistance spool for holding line in a line trimmer head, having a rotatable shaft, is provided. The spool has a rotatable main body having at least one line wound thereon. The wound line has a free end which extends radially from the main body. The spool also includes a clamping portion for restraining the free end of the line where the line extends from the main body. The spool also has an attachment portion for mounting the spool relative to the rotatable shaft for rotation therewith.

The clamp portion restrains the free end of the line so that the line does not unwind from the spool when the spool is not rotating at a sufficient speed. The clamp portion allows the line to pay out from the spool when the spool is rotated at a sufficient speed. This is due to the centrifugal force of the free end of the line pulling line, unwound from the spool, radially outward from the main body.

The main body of the spool preferably includes a hub and at least two axially disposed flanges extending radially outward from the hub. Each flange has a free periphery which cooperates with another of the flanges to restrain the free end of the line when the spool is not rotating at a sufficient speed.

At least one of the flanges is preferably made from a flexible resilient molded material such as a thermoplastic. The hub and the flanges are ideally structurally configured to form a toroidal shaped main body.

Preferably, at least one of the free peripheries is capable of being stably displaced from another of the flanges to provide an annular opening therebetween so that the line may be easily wound and unwound from the hub. Ideally, the free periphery on the flange snaps over center relative to the remainder of its flange in order to be stably displaced from the other free periphery. The spool may contain a third flange which also extends radially from the hub. The three flanges cooperate to form two separate compartments into which two separate lengths of a line may be wound.

Because the peripheries of the flanges cooperate to clamp about the free end of the line when the spool is not rotating at a sufficient speed, the line on the spool does not become unraveled. When the spool is being mounted onto a line trimmer head, the end of the line need not be held to prevent unraveling from the spool. Therefore, the spool may be mounted to the line trimmer head with a user's hands being free to thread the free end of the line through an aperture in a housing of the line trimmer head.

Still another aspect of the present invention is providing a method for mounting line in a line trimmer head. The method includes the following steps. First, line is wound on a spool with a free end of the line extending from the spool. The free end of the line is then clamped between portions of the spool to prevent the line from unraveling from the spool. The spool is then mounted within the line trimmer head. The free end of the line is inserted through an aperture in the housing without the free end of the line having to be held taut to prevent unraveling of the line from the spool.

It is an object of the present invention to provide a resistance spool which clampingly restrains line carried on the spool so that the line cannot unravel and pay out from the spool when the spool is being mounted to a line trimmer head.

It is another object to provide a method of mounting a spool having line wound thereon which does not require a user to hold a free end of line taut to prevent line from unraveling during the mounting of the spool within a housing of a line trimmer head.

Still yet another object is to provide a spool having a hub and a pair of resilient flanges which are selectively positionable between an open position in which the flanges are spaced apart from one another to facilitate the winding of line on the spool and a closed position wherein the flanges clampingly cooperate with one another to pinch a free portion of a line therebetween so that the line does not unravel from the spool.

Other objects, features and advantages will become more readily apparent from the following description and accompanying sheets of drawings.

BEST MODE FOR CARRYING OUT THE INVENTION

Figure 1:
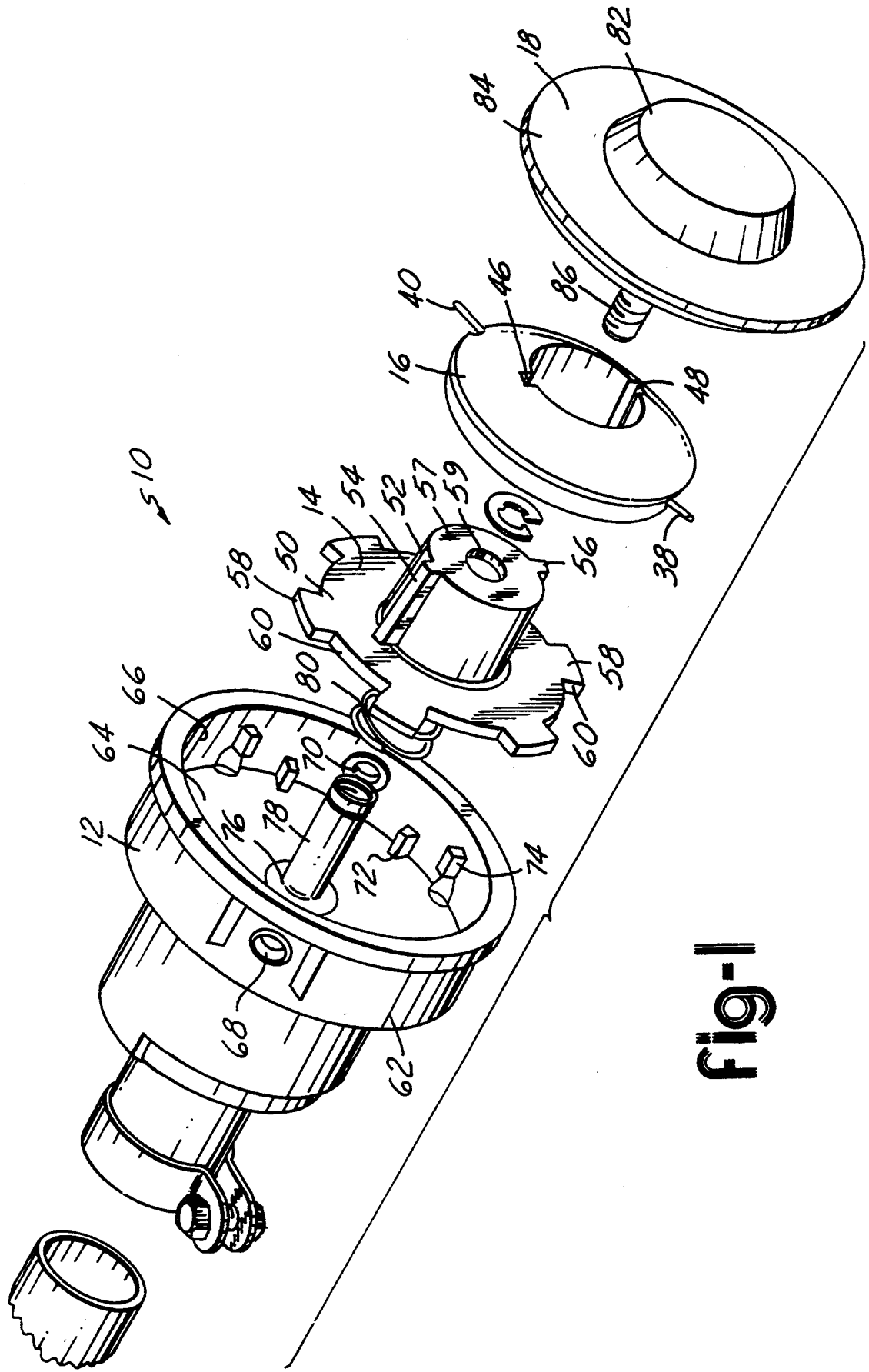
FIG. 1 is an exploded perspective view of a head for a line trimmer which utilizes a resistance spool to clampingly hold free ends of a pair of filament lines.

Referring to the drawings and in particular FIG. 1, a line trimmer head 10 of the present invention includes a cup-shaped housing 12, a rotor 14, a resistance spool 16 and an end cap 18.

Figure 3:
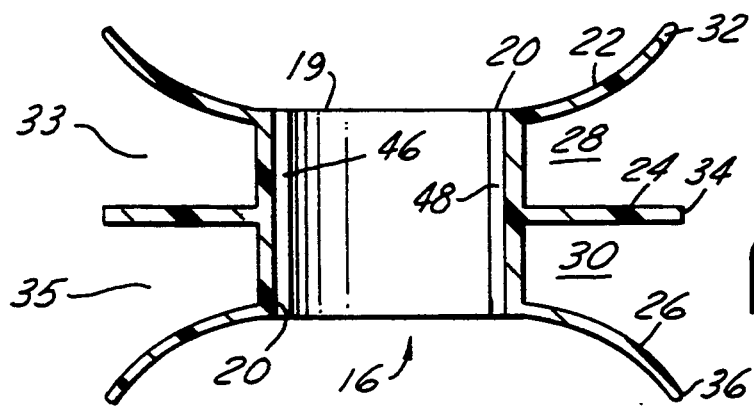
FIG. 3 is a sectional view of the resistance spool shown in an open position.

FIG. 3 shows resistance spool 16 in an open position. Resistance spool 16 is ideally made from a molded resilient material, preferably a thermoplastic. Resistance spool 16 includes a main body 19 comprising an annular hub 20 and axially spaced annular first, second and third flanges 22, 24, and 26 which extend radially outward from hub 20. First and second flanges 22 and 24 and second and third flanges 24 and 26 cooperate with one another to form annular, U-shaped first and second storage compartments 28 and 30 where spool 16 is in its open position.

Figure 2:
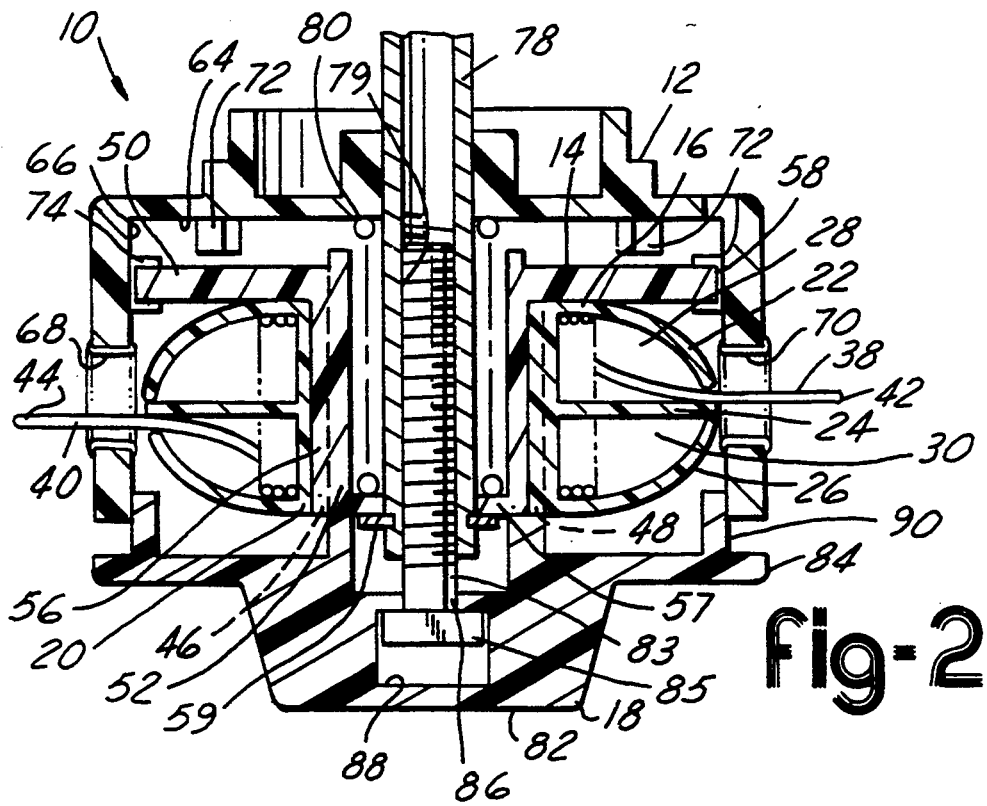
FIG. 2 is a partial sectional view through the line trimmer head.

Each of first, second and third flanges 22, 24, and 26 have respective annular peripheries 32, 34, and 36. As shown in FIG. 3, first and third peripheries 32 and 36 are flexible and resilient and may be selectively snapped over center, with respect to the remainder of their flanges, to selectively place resistance spool 16 into an open position. In this open position, first and third peripheries 32 and 36 are axially spaced apart from second free periphery 34 thereby forming annular openings 33 and 35. Openings 33 and 35 facilitate the easy winding of filament lines 38 and 40 upon hub 20 in first and second storage compartments 28 and 30. FIG. 2 shows lines 38 and 40 wound upon hub 20 in compartments 28 and 30 when spool 16 is installed within head 10.

Figure 4:
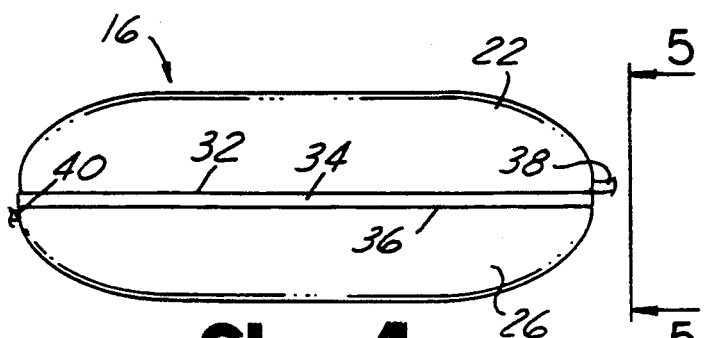
FIG. 4 is a side elevational view of the resistance spool in a closed position.
Figure 5:
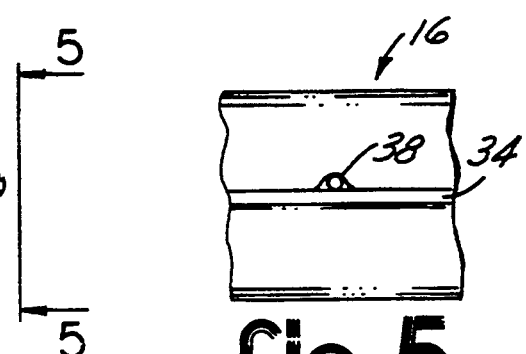
FIG. 5 is a fragmentary side elevational view, taken along line 5—5 of FIG. 4, of a line being clampingly restrained between flanges of the resistance spool.

FIG. 4 shows resistance spool 16 wherein first flange 22 and third flange 26 are selectively snapped over center into a closed position. First free periphery 32 and third free periphery 36 clampingly abut against second free periphery 34. This clamping abutment is used to restrain a portion of line 38 between peripheries 32 and 34. Similarly, diametrically opposed to line 38 is a portion of line 40 captured between peripheries 34 and 36. The clamping force created between cooperating peripheries 32 and 34 and 34 and 36 is sufficient to maintain lines 38 and 40 under tension and to prevent their unravelling from spool 16 when spool 16 is stationary.

As shown in FIGS. 1–3, a pair of diametrically opposed and axially extending rectangular keyways 46 and 48 are formed on the radial interior of hub 20. Keyways 46 and 48 cooperate with rotor 14 so that resistance spool 20 rotates with rotor 14.

Rotor 14 includes planar plate 50 which is connected to a cylinder 52. Located on the radial exterior of cylinder 52 are a pair of diametrically opposed and axially extending ribs 54 and 56 which are sized to fit within respective keyways 46 and 48 of resistance spool 16. An end plate 57, having a hole 59 therein, closes the end of cylinder 52 adjacent end cap 18. Plate 50 has a plurality of circumaxially spaced fingers 58 along its radial periphery which define a plurality of recesses 60 circumferentially located between fingers 58.

Housing 12 includes a cup shaped member 62 including radially extending top wall 64 and an annular, axially extending side wall 66 depending therefrom. Annular side wall 66 includes a pair of diametrically opposed apertures 68 and 70 through which free ends 42 and 44 of lines 38 and 40 extend. Along the inner radial surface of annular wall 66 are located first and second sets of axially and circumaxially spaced detents 72 and 74. Detents 72 are located adjacent top wall 64 with detents 74 being spaced axially downward from top wall 64. Also, detents 72 and 74 are circumferentially offset from one another.

Top wall 64 has an opening 76 formed therein through which a rotatable shaft 78 passes. Rotatable shaft 78 is hollow and has internal threads 79 for attaching end cap 18. Either an electric motor or an internal combustion engine (not shown) is used to drive and rotate rotatable shaft 78.

A helical spring 80 is interposed between top wall 64 and end plate 57 of cylinder 52 of rotor 14 thereby biasing rotor 14 axially away from top wall 64 when line trimmer head 10 is fully assembled. Helical spring 80 surrounds and is centered by rotatable shaft 78.

End cap 18 includes a cylindrical button 82 attached to an annular disc 84. A bolt 83, having a head 85 and a threaded shaft 86 is affixed within an opening 88 in button 82 so that shaft 86 turns with button 82. A cylindrical wall 90 extends axially upward from disc 84 and fits concentrically and slidably within the lower end of side wall 66 of housing 12. Accordingly, end cap 18, spool 16 and rotor 14 can move axially with respect to housing 12 by compressing spring 80.

In operation, the following steps are taken to assemble together line trimmer head 10. First, peripheries 32 and 36 of first and third flanges 22 and 26 are pulled axially apart to snap flanges 22 and 26 over center and thereby placing spool 16 into a stable open position as shown in FIG. 3. Next, respective ends on lines 38 and 40 are secured to hub 20, such as by taping (not shown), within respective compartments 28 and 30. Then lines 38 and 40 are tautly wound upon hub 20 with free ends 42 and 44 extending radially outward. When this winding process is complete, peripheries 32 and 36 are pushed axially together snapping into a closed position and clampingly restraining lines 38 and 40 against opposite sides of second free periphery 34 of second flange 24. At this point, due to the clamping engagement of the cooperating peripheries 32, 34, and 36, lines 38 and 40 cannot unravel from spool 16.

Turning to FIG. 1, the individual components of head 10 are now assembled together. Helical spring 80 is concentrically placed over rotatable shaft 78. Next, rotor 14 is placed over spring 80 with recesses 60 of plate 50 being disposed adjacent lower detents 74 of housing 12. Sufficient lengths of line 38 and 40 are pulled from spool 16 and free ends 42 and 44 are threaded through apertures 68 and 70. Because peripheries 32, 34, and 36 clampingly restrain lines 38 and 40 and prevent their unraveling from spool 16, this threading operation is easily accomplished without having to tautly hold lines 38 and 40. Keyways 46 and 48 of spool 16 are aligned with ribs 54 and 56 of rotor 14 and spool 16 is slid over cylinder 52 of rotor 14.

Finally, threaded shaft 86 is threaded into internal threads 79 of rotatable shaft 78 to hold the components of line trimmer head 10 together.

Spring 80 normally biases rotor 14 away from top wall 64 with fingers 58 circumferentially aligning with and abutting against detents 74. Engagement of detents 74 with fingers 58 causes rotor 14 and spool 16 to rotate with rotatable shaft 78 and housing 12 when the line trimmer is turned on.

When additional line is to be payed out from spool 16, button 82 is pushed against a hard surface, such as the ground, causing rotor 14 and spool 16 then to move axially upward toward top wall 64. This axial movement disengages fingers 58 from lower detents 74. Rotor 14 and spool 16 then move incrementally in a circumferential direction relative to housing 12 until engaging upper detents 72 with fingers 58. Because detents 72 and 74 are circumferentially offset from one another, incremental circumferential relative movement between rotor 14 and spool 16 with respect to housing 12 occurs. This allows a portion of lines 40 and 42 to unwind from spool 16. Releasing button 82 from the ground allows spring 80 to again bias the rotor 14 and spool 16 away from top wall 64 and detents 72. Rotor 14 and spool 16 again incrementally rotate relative to housing 12 and move back into engagement with lower detents 74. U.S. Pat. No. 5,060,284, which has been incorporated by reference, describes in fuller detail the general operation of a line trimmer head which incrementally lets out filament line.

Simultaneously, as spool 16 rotates at a high rotational speed, centrifugal forces created by the rotation of free ends 42 and 44 cause a large outward radial force to be applied on lines 38 and 40. In the preferred embodiment, the normal operating speed of the line trimmer is about 7000 RPM. Consequently, the clamping restraint on lines 38 and 40 is overcome and portions of lines 38 and 40 unwound from hub 20 are incrementally payed out from spool 16 by the "bumping" of button 82. Once the line trimmer is shut-off, the centrifugal forces disappear and lines 38 and 40 are again fully restrained by free peripheries 32, 34 and 36.

While the foregoing specification of this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principals of the invention.

For example, it is possible to make flanges 22 and 26 sufficiently flexible such that they actually separate from flange 24 when rotational speeds of line trimmer head 10 are at sufficient speeds. Accordingly, there will be no clamping force on lines 38 and 40 until the rotational speed of spool 16 is sufficiently slow so that centrifugal forces do not cause flanges 22 and 26 to separate from flange 24.

What is claimed is:

1. A resistance spool for holding line in a line trimmer head having a rotatable shaft, the spool comprising:
   a rotatable main body for holding line wound thereon with the wound line having a free end radially extending from the main body;
   the main body including a hub about which the line is wound and at least two axially disposed flanges extending radially outward from the hub, at least one flange having a free periphery which cooperates with the other flange to restrain the free end of the line so that the line cannot unwind from the spool when the main body is not rotating at a sufficient speed;
   clamp means, on said main body, for restraining the free end of the line where the line extends from the main body; and
   attachment means for mounting the main body relative to the rotatable shaft for rotation therewith;
   wherein the clamp means restrains the free end of the line so that line does not unwind from the spool when the main body is not rotating at a sufficient speed and wherein the clamp means allows the free end of the line to pay out from the spool when the main body is rotating at a sufficient speed.

2. The spool of claim 1 wherein the free periphery separates relative to the other flange when the main body is rotating at a sufficient speed.

3. The spool of claim 1 wherein:
   at least one of the flanges is made from a flexible elastomeric material.

4. The spool of claim 3 wherein:
   the material is a thermoplastic.

5. The spool of claim 1 wherein:
   the hub and the flanges are structurally configured to form a toroidal shaped main body.

6. The spool of claim 1 wherein:
   the free periphery is capable of being stably displaced from the other flange to provide an opening therebetween so that the line may be wound onto the main body.

7. The spool of claim 6 wherein:
   the free periphery may be snapped open over center relative to the remainder of its flange so that the periphery is stably displaced from the other flange to provide the opening and may be snapped closed to clamp the line between the periphery and the other flange to restrain the line.

8. The spool of claim 1 further comprising:
   a third flange extending radially from the hub and having a free periphery, the flanges forming two separate compartments into which two separate lengths of line may be respectively wound and restrained.

9. A line trimmer head comprising:
   a flexible line;
   a rotatable shaft;
   a main housing connected to the rotatable shaft and having an aperture for receiving the line therethrough; and
   a resistance spool mounted relative to the rotatable shaft within the housing and having a rotatable main body with the line wound thereon, the main body of the spool having clamp means for restraining a free end of the line;
   means for mounting and incrementally rotating the resistance spool relative to the main housing to unwind the line from the main body with the clamp means allowing the unwound line to pay out from the main body when the resistance spool is rotating at a sufficient speed;
   the resistance spool having a hub and a pair of radially outward extending flanges, the flanges cooperating to pinch and restrain the line from paying out from the spool when the spool is not rotating at a sufficient speed while allowing line to pass between the flanges when the spool is rotating at a sufficient speed;

wherein the clamp means restrains the free end of the line so that line does not pay out from the spool when the main body is not rotating at a sufficient speed, and wherein the clamp means allows line unwound from the main body to pay out from the spool when the main body is rotating at a sufficient speed.

10. A method of mounting line in a line trimmer head, the method comprising the steps of:

providing a spool having a hub and a pair of flanges extending radially outward from the hub, at least one flange having a free peripheral edge;

winding line on the spool with a free end of the line extending from the spool;

clamping a portion of the free end between the peripheral edge and the other flange to prevent the line from unwinding; and mounting the spool relative to a housing of a line trimmer head with the free end of the line extending radially outward from the spool and through an aperture in the housing.

11. The method of claim 10 wherein:

the hub and the pair of flanges are formed into a toroidal configuration.

12. The method of claim 14 wherein:

the flanges are selectively positionable between an over-center open position wherein the peripheral edge is spaced apart relative to the other flange to allow line to be wound on the spool and a closed position wherein the free peripheral edge bears upon the other flange with the free portion of the line being clampingly held therebetween to thereby prevent the line from unraveling from the spool when the spool is mounted relative to the housing.

* * * * *